United States Patent
Barsukova et al.

(10) Patent No.: US 10,275,517 B2
(45) Date of Patent: *Apr. 30, 2019

(54) DETECTING OVERNEGATION IN TEXT

(71) Applicant: International Business Machines Corporation, Armonk, NY (US)

(72) Inventors: Agnia Barsukova, Dublin (IE); David M. Curran, Dublin (IE); Amelia C. Kelly, Dublin (IE)

(73) Assignee: International Business Machines Corporation, Armonk, NY (US)

( * ) Notice: Subject to any disclaimer, the term of this patent is extended or adjusted under 35 U.S.C. 154(b) by 144 days.

This patent is subject to a terminal disclaimer.

(21) Appl. No.: 15/168,678

(22) Filed: May 31, 2016

(65) Prior Publication Data

US 2016/0350407 A1    Dec. 1, 2016

Related U.S. Application Data

(63) Continuation of application No. 14/725,259, filed on May 29, 2015.

(51) Int. Cl.
| | | |
|---|---|---|
| *G06F 17/00* | (2006.01) | |
| *G06F 17/30* | (2006.01) | |
| *G06F 17/27* | (2006.01) | |

(52) U.S. Cl.
CPC ...... *G06F 17/30675* (2013.01); *G06F 17/274* (2013.01); *G06F 17/2785* (2013.01)

(58) Field of Classification Search
CPC ... G06F 17/273; G06F 17/274; G06F 17/2785
(Continued)

(56) References Cited

U.S. PATENT DOCUMENTS 5,576,955 A * 11/1996 Newbold ............ G06F 17/273
715/212
5,890,182 A * 3/1999 Yagisawa ............ G06F 17/273
704/8

(Continued)

FOREIGN PATENT DOCUMENTS

| CN | 102855276 A | 1/2013 |
| CN | 103729345 A | 4/2014 |
| WO | 2006042028 A2 | 4/2006 |

OTHER PUBLICATIONS

Giora et al., "Negation in Context: A Functional Approach to Suppression", Discourse Processes, 43(2), pp. 153-172, Copyright © 2007, Lawrence Erlbaum Associates, Inc.

(Continued)

*Primary Examiner* — Daniel Abebe
(74) *Attorney, Agent, or Firm* — Edward J. Wixted, III (57) ABSTRACT

Detecting overnegation in text is provided. A plurality of word lists are compiled. An input text is received. One or more combined weightings are determined, wherein each combined weighting is based, at least in part, on a portion of the input text and the plurality of word lists. A total overnegation score of the input text is generated based, at least in part, on a statistical aggregation of the one or more combined weightings. In response to determining that the total overnegation score exceeds a pre-determined threshold, it is determined that the input text contains a logical error. In response to the total overnegation score exceeding a pre-determined level, one or more actions are executed.

7 Claims, 3 Drawing Sheets

(58) Field of Classification Search
USPC .......................................................... 704/9
See application file for complete search history.

(56) References Cited

U.S. PATENT DOCUMENTS

| | | | |
|---|---|---|---|
| 6,564,185 | B1 | 5/2003 | Miyazawa et al. |
| 6,618,697 | B1 | 9/2003 | Kantrowitz et al. |
| 7,389,220 | B2 | 6/2008 | Kharrat |
| 7,822,701 | B2 | 10/2010 | Carter et al. |
| 7,937,657 | B2 | 5/2011 | Bates et al. |
| 7,987,151 | B2 | 7/2011 | Schott et al. |
| 2005/0256700 | A1 | 11/2005 | Moldovan et al. |
| 2008/0249764 | A1 | 10/2008 | Huang et al. |
| 2009/0006950 | A1 | 1/2009 | Gross et al. |
| 2009/0164890 | A1 | 6/2009 | Zhu et al. |
| 2012/0265520 | A1 | 10/2012 | Lawley |

OTHER PUBLICATIONS

Kim et al., "Patient Information Extraction in Noisy Tele-health Texts", 2013 IEEE International Conference on Bioinformatics and Biomedicine, ©2013 IEEE, pp. 326-329.

Liberman, Mark, "No post too obscure to escape notice", Language Log, Nov. 27, 2009, Filed by Mark Liberman under Psychology of language, Semantics, pp. 1-3, <http://languagelog.Idc.upenn.edu/nll/?p=1925>.

Liberman, Mark, "Why Are Negations So Easy to Fail to Miss?", Feb. 26, 2004, Language Log, Offsite backup for world's languages | Main | Hayek on Hebb, pp. 1-4, <http://itre.cis.upenn.edu/~languagelog/archives/000500.html>.

Neal, "An Overnegation and a Zeugma", Posted by Neal on Aug. 24, 2007, Literal-Minded, Linguistic commentary from a guy who takes things too literally, pp. 1-3, <https://literalminded.wordpress.com/2007/08/24/an-overnegation-and-a-zeugma/>.

Neal, "Overnegation vs. Multiple Negation", Posted by Neal on Oct. 17, 2004, Literal-Minded, Linguistic commentary from a guy who takes things too literally, pp. 1-3, <https://literalminded.wordpress.com/2004/10/17/overnegation-vs-multiple-negation/>.

U.S. Appl. No. 14/725,259 Entitled "Detecting Overnegation in Text", filed May 29, 2015.

Appendix P.: List of IBM Patents or Patent Applications Treated as Related, dated May 31, 2016, 2 pages.

* cited by examiner

DETECTING OVERNEGATION IN TEXT

TECHNICAL FIELD

The present invention relates to detecting logical errors in text, and more specifically to detecting overnegation in text.

BACKGROUND

Cognitive systems, such as virtual assistants, can be used to provide a fluid human-machine interaction. As the interactions between humans and virtual assistants become more fluid, the language used by the user tends to become more colloquial. However, the social intelligence of the virtual assistant does not improve; therefore, the virtual assistant is unable to understand the more colloquial language.

Contradictory language and inconsistent inputs can interfere with a cognitive system's understanding of a text input. An example of such an input is when a user uses a double negative or regional vernacular.

SUMMARY

An embodiment of the invention provides a method of detecting overnegation in text. The method comprising: compiling, by one or more processors, a plurality of word lists; receiving, by one or more processors, an input text; determining, by one or more processors, one or more combined weightings, wherein each combined weighting is based, at least in part, on a portion of the input text and the plurality of word lists; generating, by one or more processors, a total overnegation score of the input text based, at least in part, on a statistical aggregation of the one or more combined weightings; determining, by one or more processors, that the total overnegation score exceeds a pre-determined threshold and, in response, determining that the input text contains a logical error; and responsive to the total overnegation score exceeding one or more pre-determined levels, executing, by one or more processors, one or more actions.

According to another embodiment of the present disclosure, a computer program product for detecting overnegation in text is provided. The computer program product comprises a computer readable storage medium and program instructions stored on the computer readable storage medium. The program instructions include program instructions to compile a plurality of word lists; program instructions to receive an input text; program instructions to determine one or more combined weightings, wherein each combined weighting is based, at least in part, on a portion of the input text and the plurality of word lists; program instructions to generate a total overnegation score of the input text based, at least in part, on a statistical aggregation of the one or more combined weightings; program instructions to determine that the total overnegation score exceeds a pre-determined threshold and, in response, determine that the input text contains a logical error; and responsive to the total overnegation score exceeding one or more pre-determined levels, program instructions to execute one or more actions.

According to another embodiment of the present disclosure, a computer system for detecting overnegation in text is provided. The computer system includes one or more computer processors, one or more computer readable storage media, and program instructions stored on the computer readable storage media for execution by at least one of the one or more processors. The program instructions include program instructions to compile a plurality of word lists; program instructions to receive an input text; program instructions to determine one or more combined weightings, wherein each combined weighting is based, at least in part, on a portion of the input text and the plurality of word lists; program instructions to generate a total overnegation score of the input text based, at least in part, on a statistical aggregation of the one or more combined weightings; program instructions to determine that the total overnegation score exceeds a pre-determined threshold and, in response, determine that the input text contains a logical error; and responsive to the total overnegation score exceeding one or more pre-determined levels, program instructions to execute one or more actions.

DETAILED DESCRIPTION

Embodiments of the present invention detect, display and/or correct logical errors of a user's speech. This detection, display and/or correction of logical errors is to aid the understanding by cognitive systems. An example of a logical error is overnegation.

Embodiments of the present invention recognize that one of the problems preventing the use of an input text by a cognitive system is contradictory or inconsistent user inputs. For example, fluid human-machine interaction may be prevented by the inability of the virtual assistant (VA) to detect a logical error made by the user, e.g., when a user says something that is the opposite of their intended meaning. As Natural Language Processing (NLP) algorithms become more sophisticated, the technology to process text and to interact with it improves. The ability of a cognitive system to identify when text cannot be used effectively becomes more important as users write text that is intended to be used by a cognitive system. For example, a problem arises when users begin to interact less rigidly with VAs. The user's language becomes more colloquial, but the social intelligence of the VA doesn't improve, which can cause errors within the cognitive system. Errors in the cognitive system leads to an unsatisfactory user experience when communicating with a VA. To avoid the errors, users revert to a more structured form of dialogue. The VA's understanding and response can be improved by detecting when a user interacts with a VA in a way not deliberately different from their intended meaning.

Figure 1:
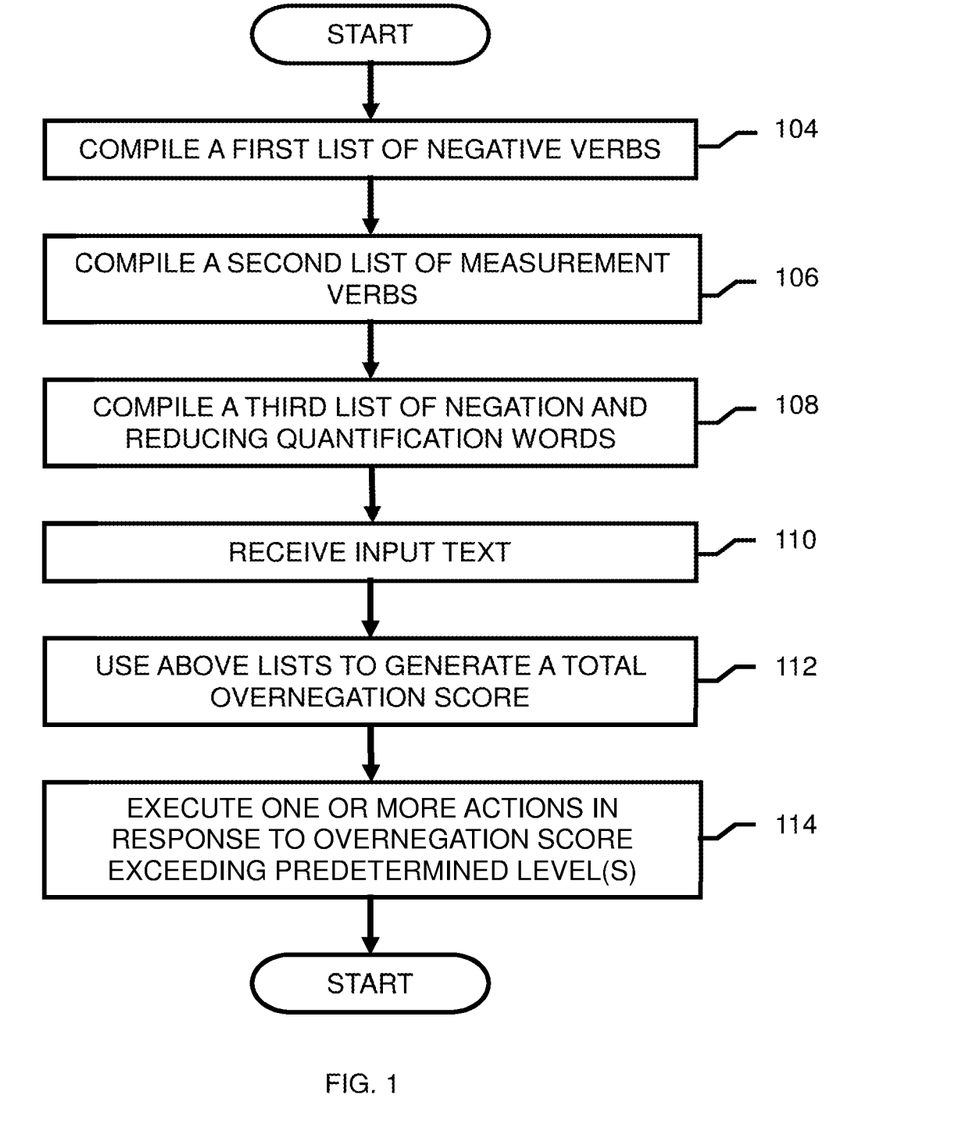
FIG. 1 is a flowchart depicting operations of detecting overnegation in text, on a computing device, in accordance with an embodiment of the present invention.

FIG. 1 shows a flowchart depicting operations of detecting overnegation in text. The embodiment of FIG. 1 may be used in a VA interface, but is not limited to being used in such a VA interface. The embodiment shown in FIG. 1 identifies a logical error where the stated meaning of the input text is different from the user's intended meaning or where the input text contradicts other knowledge in the corpus.

Semantic ambiguity can be caused by the use of contextually inaccurate, improbable language. Detection methods of the present invention are for overnegation, one kind of semantically ambiguous language. In some embodiments, other forms of semantically ambiguous structures are added to an embodiment of FIG. 1. Overnegation is the unintentional reversal of meaning of a portion of language caused by the occurrence of a negative word or particle and the use of ambiguous verbs and/or quantification. Examples of overnegation include: (i) "You can't fail to miss it;" (ii) "The quality of the merchandise cannot be underestimated;" (iii) "I don't want to discourage people from not voting today;" and (iv) "The experience was a lot less painless than expected. Nice. I'm now connected!" In each of these examples the intended meaning is different from the literal meaning. If you cannot fail to miss something, you will miss it. If you estimate something as having zero quality then no lower quality is possible. If something is less painless it is more painful which is not good.

Overnegation is detected by analyzing the content and syntax of the input text. Overnegation tends to lead to semantic ambiguities. A typical person can hold about five to nine items in their working memory. Handling negation takes up some of this channel capacity. Text containing double negatives are well known to cause confusion. When a text has a triple negation it becomes too complicated to understand for all but the most attentive person. Overnegation is a strong signal that the user's literal meaning is different than the intended meaning. The quality of the cognitive system can be compromised if the answer units entered into a cognitive system are inconsistent or have ambiguous meaning.

Characteristics of overnegation include: (i) a phrase containing a negative word or particle in conjunction with an negative, opinion, or measurement verb; (ii) a phrase that is cognitively difficult to process; (iii) a phrase that is unintentional; and (iv) and a phrase that means the exact opposite to what the user intends when logically thought through.

Figure 2:
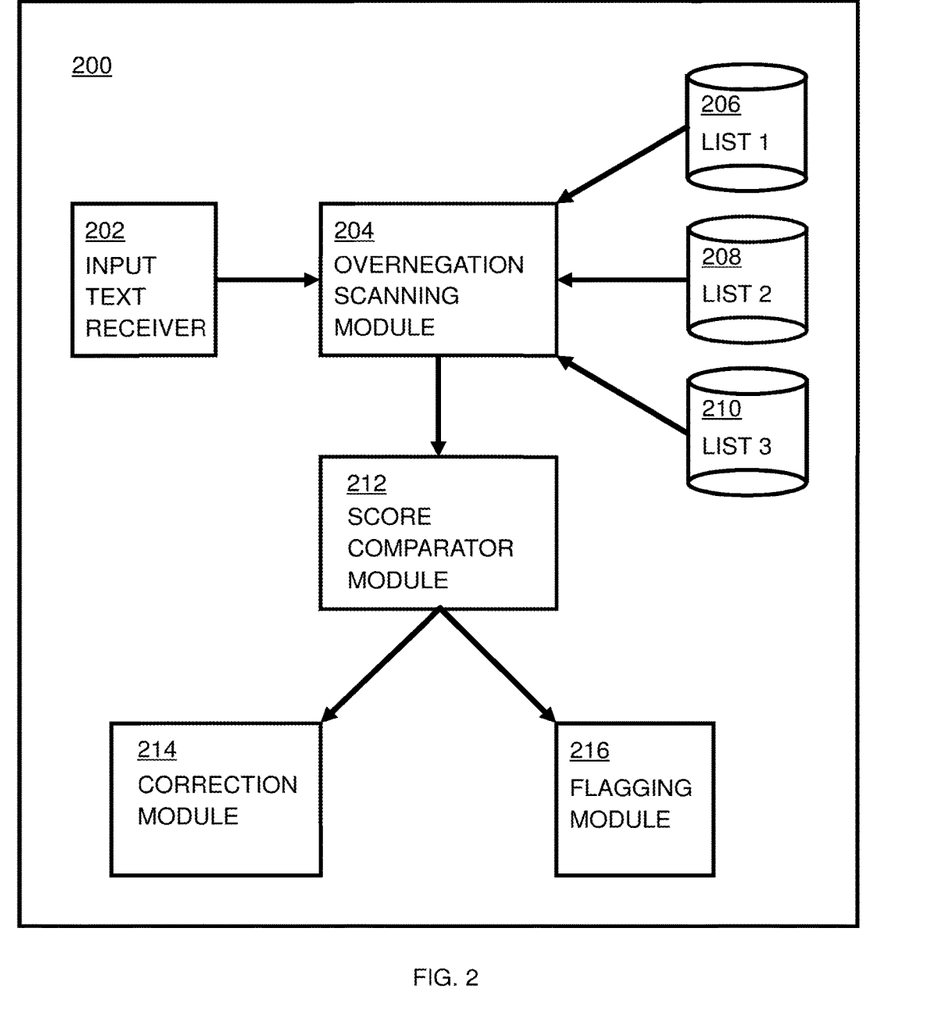
FIG. 2 is a block diagram of an exemplary system for detecting overnegation in text in accordance with an embodiment of the present invention.

FIG. 2, shows a flow chart of an embodiment of a computer-implemented operations of detecting overnegation in text according to the present invention. An embodiment of the present invention will now be describe with reference to FIGS. 1 and 2. At step 104, first list 206 (FIG. 2) of negative verbs and/or adjectives is compiled. For example, first list 206 can comprise words such as "fail," "discourage," "painful," "miss," "refute," "avoid," and "ignore." First list 206 of negative verbs and/or adjectives will typically comprise many more entries, the entries provided are merely exemplary. Negative verbs are verbs that have semantic (e.g., "fail" is the same as "not succeed") or morphologic (e.g., "untwist") negation. Negative adjectives are adjectives that have semantic (e.g., "void" is the same as "not valid") or morphologic (e.g., "restless") negation.

At step 106, second list 208 (FIG. 2) of measurement verbs such as "estimate," "judge,", "value," "underestimate," and "rate" is compiled. Second list 208 of measurement verbs will typically comprise many more entries, the entries provided are merely exemplary. Measurement verbs are verbs that imply uncertainty (e.g., "estimate").

At step 108, a third list 210 (FIG. 2) of negation and mitigation words such as "not" and "less" is compiled. As well as "not", the contracted forms using "n't" as in "can't" and "don't" are included. Third list 210 of negation and mitigation words will typically comprise many more entries, the entries provided are merely exemplary. Negation words are a closed set of function words with explicit morphologic negation (e.g., "no", "not", "n't", "nobody"). Mitigation words are a closed set of determiners referring to small quantity (e.g., "a little") and adverbs of small degree (e.g., "barely").

At step 110, input text 202 (FIG. 2) is received. Input text receiver 202 receives text from a user by means of speech input, typed input, or any other form of input that will provide text. The text should be a primary clause and any subordinate clauses. The following eight examples of text will be used to facilitate further explanation of the operation of embodiments of the invention. (i) "You can't fail to miss it;" (ii) "You can't fail to see it;" (iii) "The quality of the merchandise cannot be underestimated;" (iv) "The quality of the merchandise cannot be overestimated;" (v) "I don't want to discourage people from not voting today;" (vi) "I don't want to discourage people from voting today;" (vii) "The experience was a lot less painless than expected. Nice. I'm now connected!" and (viii) "The experience was a lot less painful than expected. Nice. I'm now connected!"

At step 112, first list 206, second list 208 and third list 210 are used to generate a total overnegation score for the text. In some embodiments of the invention, overnegation scanning module 204 (FIG. 2) generates the overnegation score. Each of the words in the text is given a combined weighting based on appearance or non-appearance in each of first list 206, second list 208 and third list 210. The combined weighting of each word is aggregated to determine an overnegation score of the text. When the overnegation score of the text is higher than a predetermined threshold (e.g., three) the text is marked as likely to cause misunderstanding due to overnegation.

In embodiments of the invention, the scoring system may be Bayesian, logistic regression, or other classification methods. A suitable Bayesian scoring system will now be briefly described, though similar acceptable scoring will be familiar to persons skilled in the art. Assume that an example text contains the word "underestimated". The probability (Pr(O|W) that the text is overnegated is calculated using the following formula (Equation 1) derived from Bayes' theorem, where: Pr(O|W) is the probability that a message is overnegated (e.g., a message containing the word "underestimated"); Pr(O) is the overall probability that any given message is overnegated; Pr(W|O) is the probability that a particular word (e.g., the word "underestimated") appears in overnegated messages; Pr(W|N) is the probability that the particular word (e.g., "underestimated") appears in overnegated messages; and Pr(N) is the overall probability that any given message is not overnegated.

$$Pr(O \mid W) = \frac{Pr(W \mid O)Pr(A)}{Pr(W \mid O)Pr(O) + Pr(W \mid N)Pr(N)} \quad \text{(Eq. 1)}$$

Some usage of overnegation can be idiomatic. For example, "I could care less" is an idiom that literally means "I could not care less." It is also possible to use overnegation in an intentional way to signify irony. This usage may be rare in everyday conversation as experienced by a VA. The overnegation may be detected in a dialogue or inside a document. Several example cases, numbered 1-8, are now discussed in turn.

In example number 1, "You can't fail to miss it," the word "not", extracted from the contraction "can't", is a negation and mitigation word found in third list 210, "fail" is a negative verb found in first list 206, and "miss" is also a negative verb found in first list 206. In one embodiment, the number of words in a text that appear in any of the three lists is simply counted to generate a total overnegation score. For example number 1, there are three words that appear in any of first list 206, second list 208 or third list 210. Therefore, the overnegation score for example number 1 is three.

In other embodiments, the number of occurrences of words in each of first list 206, second list 208, or third list 210 may be weighted differently to arrive at an overnegation score. In further embodiments the number of occurrences of words in each of first list 206, second list 208 or third list 210 may be used as a feature for a classifier. The features may be given a different weight in influencing an overall decision.

In example number 2, "You can't fail to see it," the "not" portion of "can't" is a negation word found in third list 210 and "fail" is a negative verb found in first list 206. For example number 2, there are two words that appear in any of first list 206, second list 208 or third list 210 and so the overnegation score for example number 2 is two. In comparison to example number 1, example number 2 has the word "see" in place of the word "miss". Therefore, unlike example number 1, is not a text having overnegation.

In example number 3, "The quality of the merchandise cannot be underestimated," the "not" portion of "cannot" is a negation word found in third list 210 and "underestimated" is a negative verb found in first list 206. For example number 3, there are two words that appear in any of first list 206, second list 208 or third list 210 and so the overnegation score for example number 3 is two.

In example number 4, "The quality of the merchandise cannot be overestimated," the "not" portion of "cannot" is a negation word found in third list 210. For example number 4, there is one word that appears in any of first list 206, second list 208 or third list 210 and so the overnegation score for example number 4 is one. Example number 4 has the word "overestimated" in place of the word "underestimated" in example number 3 and so, unlike example number 3, example number 4 does not have overnegation.

In example number 5, "I don't want to discourage people from not voting today," the "not" portion of "don't" is a negation word found in third list 210, "discourage" is a negative verb found in first list 206 and "not" is also a negation word found in third list 210. For example number 5, there are three words that appear in any of first list 206, second list 208, or third list 210 and so the overnegation score for example number 5 is three.

In example number 6, "I don't want to discourage people from voting today," the "not" portion of "don't" is a negation word found in third list 210 and "discourage" is a negative verb found in first list 206. For example number 6, there are two words that appear in any of first list 206, second list 208 or third list 210 and so the overnegation score for example number 6 is two. When compared to example number 5, example number 6 has the word "not" removed from before the phrase "voting today." Therefore, unlike example number 5, example number 6 does not have text overnegation.

In example number 7, "The experience was a lot less painless than expected. Nice. I'm now connected!", the short phrase "a lot less" is a mitigation word found in third list 210 and "painless" is a negative adjective found in first list 206. For example number 7, there are three words that appear in any of first list 206, second list 208, or third list 210 and so the overnegation score for example number 7 is three.

In example number 8, "The experience was a lot less painful than expected. Nice. I'm now connected!", "a lot less" is a mitigation word found in third list 210. For example number 8, there is one word that appears in any of first list 206, second list 208, or third list 210 and so the overnegation score for example number 8 is one. Example number 8, in comparison to example number 7, has the word "painful" in place of "painless". Therefore, unlike example number 7, example number 8 does not have text overnegation.

At step 114, once the overnegation score exceeds one or more pre-determined levels, one or more actions may be executed. In one embodiment, an action module, such as score comparator module 212 (FIG. 2), compares the overnegation score with the one or more pre-determined levels. In the examples 1 to 8 above, a first pre-determined level of the overnegation score exceeding two may be used to indicate that a text is overnegated. Other pre-determined levels may be used, depending on the particular contents of first list 206, second list 208, and third list 210. In other embodiments, a second pre-determined level (e.g., four) may also be used.

In an embodiment, one of the actions executed is that the overnegation is flagged to a user. This may be done by an action module, such as flagging module 216 (FIG. 2). In the example above, such flagging to the user may be done when the first pre-determined level of two is exceeded, that is for examples 1, 5, and 7. In another embodiment, if the confidence in the logical error is high enough, one of the actions is to automatically correct the logical error. In the example above, such correction of the logical error may be done when the second pre-determined level of four is exceeded. This does not occur for any of the examples 1 to 8, but may occur with other examples. This may be done by correction module 214 (FIG. 2). In yet another embodiment, overnegation is flagged to a user by flagging module 216 if a first pre-determined overnegation score is exceeded and is corrected by correction module 214 if a second pre-determined overnegation score is exceeded. These actions and numbers of pre-determined levels are provided as an example only and embodiments of the invention may use further actions and numbers of pre-determined levels. As can be seen above, example number 3 is an example of overnegation which is not identified by the described embodiment of the present invention. In this simplified example, this means that 75% of text having overnegation are identified. A more complex implementation would improve this performance.

Figure 3:
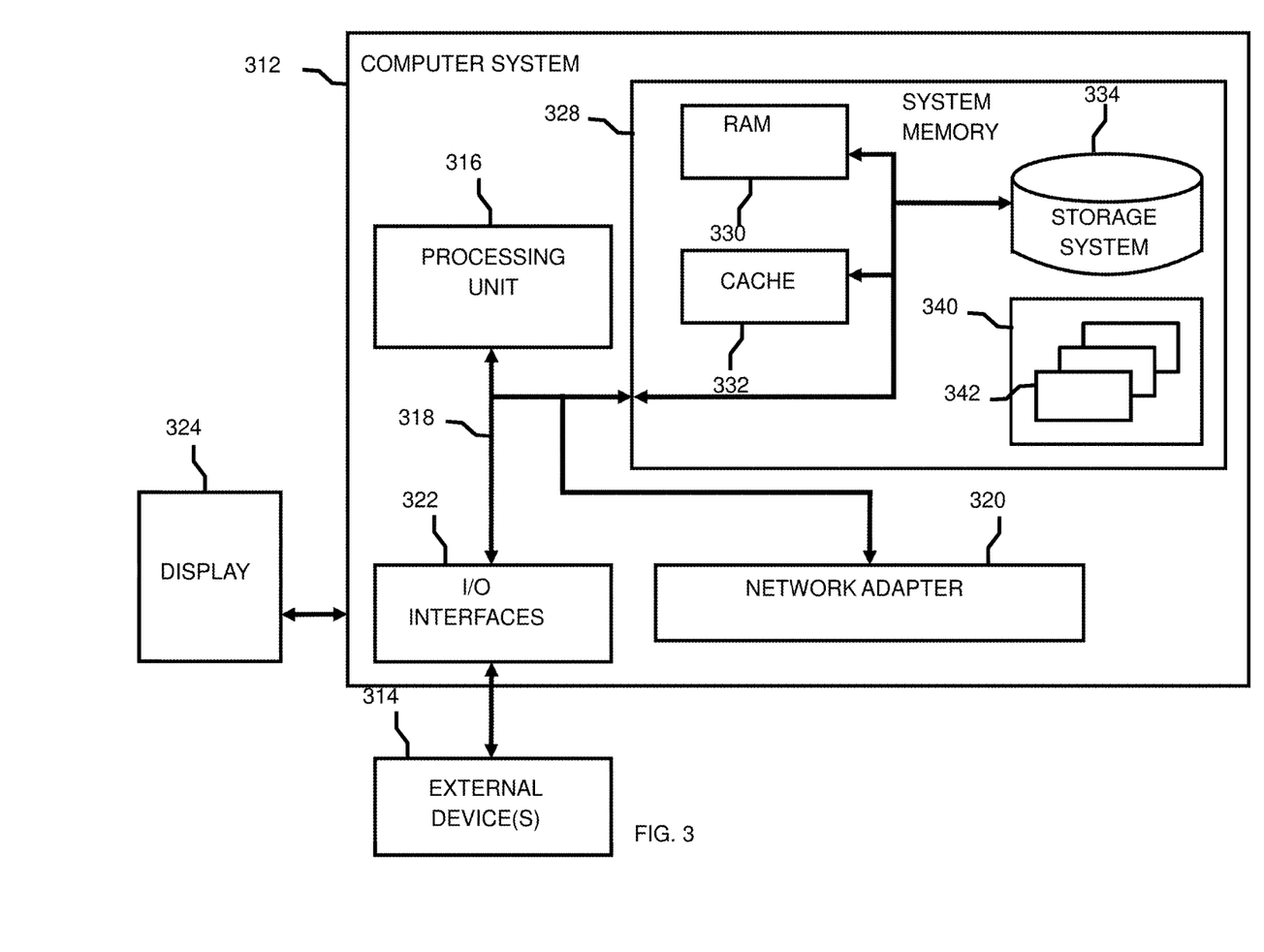
FIG. 3 is block diagram of components of a computing device executing operations for detecting overnegation in text, in accordance with an embodiment of the present invention.

Referring now to FIG. 3, a schematic of an example of computing system is shown. Computing system 312 is only one example of a suitable computing system and is not intended to suggest any limitation as to the scope of use or functionality of embodiments of the invention described herein. Regardless, computing system 312 is capable of being implemented and/or performing any of the functionality set forth hereinabove.

Computer system/server 312 is operational with numerous other general purpose or special purpose computing system environments or configurations. Examples of well-known computing systems, environments, and/or configurations that may be suitable for use with computer system/server 312 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 312 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 312 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 3, computer system/server 312 is shown in the form of a general-purpose computing device. The components of computer system/server 312 may include, but are not limited to, one or more processors or processing units 316, a system memory 328, and a bus 318 that couples various system components including system memory 328 to processor 316.

Bus 318 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 312 typically includes a variety of computer system readable media. Such media may be any available media that is accessible by computer system/server 312, and it includes both volatile and non-volatile media, removable and non-removable media.

System memory 328 can include computer system readable media in the form of volatile memory, such as random access memory (RAM) 330 and/or cache memory 332. Computer system/server 312 may further include other removable/non-removable, volatile/non-volatile computer system storage media. By way of example only, storage system 334 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 318 by one or more data media interfaces. As will be further depicted and described below, memory 328 may include at least one program product having a set (e.g., at least one) of program modules that are configured to carry out the functions of embodiments of the invention.

Program/utility 340, having a set (e.g., at least one) of program modules 342, may be stored in memory 328 by way of example, and not limitation, as well as an operating system, one or more application programs, other program modules, and program data. Each of the operating system, one or more application programs, other program modules, and program data or some combination thereof, may include an implementation of a networking environment. Program modules 342 generally carry out the functions and/or methodologies of embodiments of the invention as described herein.

Computer system/server 312 may also communicate with one or more external devices 314 such as a keyboard, a pointing device, a display 324, etc.; one or more devices that enable a user to interact with computer system/server 312; and/or any devices (e.g., network card, modem, etc.) that enable computer system/server 312 to communicate with one or more other computing devices. Such communication can occur via Input/Output (I/O) interfaces 322. Still yet, computer system/server 312 can communicate with one or more networks such as a local area network (LAN), a general wide area network (WAN), and/or a public network (e.g., the Internet) via network adapter 320. As depicted, network adapter 320 communicates with the other components of computer system/server 312 via bus 318. It should be understood that although not shown, other hardware and/or software components could be used in conjunction with computer system/server 312. Examples, include, but are not limited to: microcode, device drivers, redundant processing units, external disk drive arrays, RAID systems, tape drives, and data archival storage systems, etc.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method of detecting overnegation in text, the method comprising:
    compiling, by one or more processors, a plurality of word lists, wherein the plurality of word lists includes: a first list including one or more negative verbs and adjectives, a second list including one or more measurement verbs, and a third list including one or more negation and mitigation words;
    receiving, by one or more processors, an input text;
    determining, by one or more processors, one or more combined weightings, wherein each combined weighting is based, at least in part, on a portion of the input text and the plurality of word lists;
    generating, by one or more processors, a total overnegation score of the input text based, at least in part, on a statistical aggregation of the one or more combined weightings;
    determining, by one or more processors, that the total overnegation score exceeds a pre-determined threshold and, in response, determining that the input text contains a logical error wherein the logical error is an overnegation; and
    responsive to the total overnegation score exceeding one or more pre-determined levels, executing, by one or more processors, one or more actions.

2. The method of claim 1, wherein determining a first combined weighting is based, at least in part, on a number of occurrences of a first portion of the input text for each of the plurality of word lists and a weight corresponding to each of the plurality of word lists.

3. The method of claim 1, wherein the statistical aggregation includes a logistic regression classification technique.

4. The method of claim 1, wherein the statistical aggregation includes a Bayesian technique.

5. The method of claim 1, wherein one of the one or more actions comprises correction of the logical error.

6. The method of claim 1, wherein one of the one or more actions comprises flagging the logical error to a user.

7. The method of claim 1, further comprising:
    determining, by one or more processors, that the total overnegation score exceeds a first pre-determined level and, in response, flagging the logical error to a user; and determining, by one or more processors, that the total overnegation score exceeds a second pre-determined level and, in response, correcting the logical error.

\* \* \* \* \*